United States Patent
Fujisaki et al.

[15] 3,639,673
[45] Feb. 1, 1972

[54] VERTICALLY DISPOSED ISOLATED PHASE BUS

[72] Inventors: Yoshio Fujisaki; Akira Suzuoki, both of Hitachi; Eiichi Ishibashi, Mito, all of Japan

[73] Assignee: Hitachi, Ltd., Tokyo, Japan

[22] Filed: Aug. 5, 1970

[21] Appl. No.: 61,316

[30] Foreign Application Priority Data

Aug. 15, 1969 Japan..................................44/64183

[52] U.S. Cl............................................174/16 B, 174/100
[51] Int. Cl. .......................................................H02g 5/06
[58] Field of Search...............174/16 B, 38, 68 B, 99 B, 99 E, 174/100; 307/147

[56] References Cited

UNITED STATES PATENTS

| | | | |
|---|---|---|---|
| 2,706,744 | 4/1955 | Rudd | 174/99 E |
| 3,230,293 | 1/1966 | Turgeon | 174/16 B |
| 3,333,048 | 7/1967 | Burrell | 174/100 |

Primary Examiner—Laramie E. Askin
Attorney—Craig, Antonelli & Hill

[57] ABSTRACT

Vertically disposed isolated phase bus whose length reaches to hundreds of yards including a conductor bar, a sheath concentrically enclosing the bar so as to define an annular space therebetween substantially uninterrupted over the whole length of the bar and supporting insulators supporting the bar on the sheath, wherein substantially uninterrupted successive small turbulent free-convection flows are formed along the longitudinal direction of the annular space, when the bar conducts electric current.

8 Claims, 6 Drawing Figures

PATENTED FEB 1 1972

INVENTORS
YOSHIO FUJISAKI, AKIRA SUZUOKI
BY   AND EIICHI ISHIBASHI

Craig, Antonelli, Stewart & Hill
ATTORNEYS

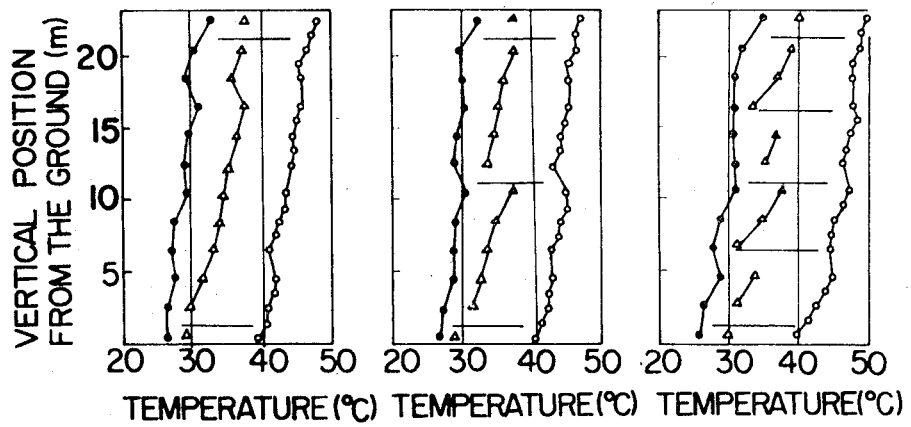
FIG. 3a  FIG. 3b  FIG. 3c
FIG. 4
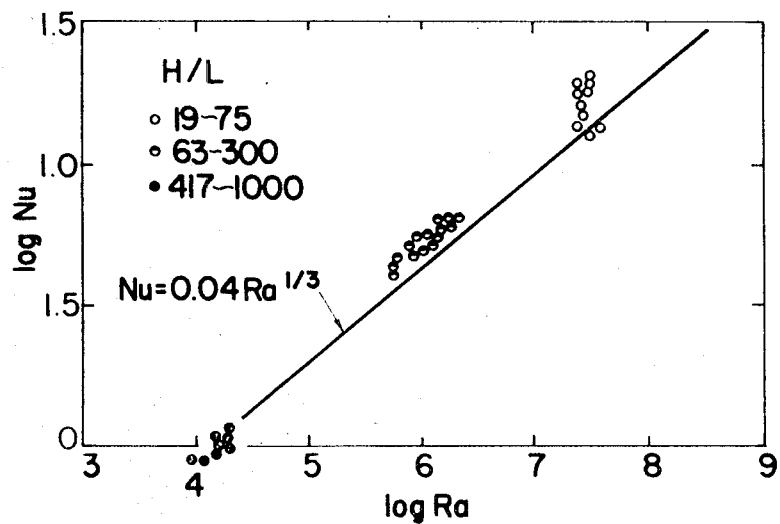

VERTICALLY DISPOSED ISOLATED PHASE BUS

BACKGROUND OF THE INVENTION

This invention relates to a vertically disposed isolated phase bus which is used as a main circuit electrically connecting a generator and a main transformer.

A conventional vertically disposed isolated phase bus comprises a conductor bar, a sheath or casing enclosing the conductor bar defining an annular space therebetween, supporting insulators supporting the bar on the sheath and partition plates dividing the space into a plurality of compartments along its vertical direction. The partition plates are considered necessary to attain the following two functions relating to heat transfer by natural convection through the space from the conductor bar to the sheath, when the conductor bar is heated by an electric current flowing therethrough during the operation of the isolated phase bus.

One function of the partition plates is to reduce the height or vertical distance ($H$) of each compartment which constitutes an enclosed vertical layer so as to decrease the ratio of height ($H$) to thickness or horizontal length ($L$) of the enclosed vertical layer. Since the Nusselt number ($Nu$), which represents the heat transfer characteristic of natural convection in an enclosed vertical layer, is expressed as a function of the ratio $H/L$ and the Rayleigh number ($Ra$) as follows: $Nu = C \cdot Ra \cdot (H/L)^n$ where $L$ represents the shortest horizontal distance between the exterior of the conductor and the interior of the casing surrounding the conductor, $C$ is an experimental constant and changes from 0.057 to 0.280, depending upon the nature of the medium filling the compartment, $n$ is a constant, but changes depending upon the ratio $H/L$, that is, when $H/L$ is less than or equal to 1.5, $n$ is positive but is near 0. When $H/L$ is greater than 1.5, $n$ is negative and approaches 0 from the negative side, as $H/L$ increases; it is generally considered that the smaller the ratio of ($H/L$) the larger will be the Nusselt number.

The other function of the partition plates is to prevent a superheating by natural convection around the upper portion of the isolated phase bus. By dividing the annular space into compartments, this natural convection is destroyed. However, in the planning pump-up power station, the height or vertical length of the isolated phase bus sometimes reaches above a hundred yards; accordingly, this great length necessitates the installation of an extremely large number of partition plates, which greatly increases the cost of construction of the isolated phase bus. Further, the partition plates are often contaminated during operation of the arrangement which sometimes causes a spark discharge to form from the conductor bar to the sheath through the surface thereof. Accordingly, it is necessary to inspect and replace the plates periodically.

SUMMARY OF THE INVENTION

One object of the present invention is to provide an isolated phase bus having a simplified structure which considerably reduces its construction cost.

Another object of the present invention is to provide an isolated phase bus having a high electrical reliability.

Still another object of the present invention is to provide an isolated phase bus limiting spark discharges from the conductor bar to the sheath.

A further object of the present invention is to provide an isolated phase bus having a good heat transfer characteristic from the conductor bar to the sheath.

In carrying out the present invention in one form, the present invention is provided with an annular space defined between the electrical conducting means and the casing means substantially uninterrupted over the whole length of the conducting means so that substantially uninterrupted successive small turbulent free-convection flows are formed along the longitudinal direction of the annular space when the conducting means is carrying an electric current. In other words, the present invention does not require partition plates which were installed conventionally to divide the annular space into a plurality of compartments.

The present invention will be better understood and its various objects and advantages will be more fully appreciated from the following description taken in conjunction with the accompanying drawings.

BRIEF DESCRIPTION OF THE DRAWING

FIGS. 3a, 3b and 3c are graphical illustrations obtained by experiment showing the temperature distribution along the vertical direction of three different isolated phase bus constructions.

FIG. 4 is a graphical illustration showing the relationship between Nusselt numbers and Rayleigh numbers, in accordance with experimental results of various isolated phase bus combinations.

DESCRIPTION OF THE PREFERRED EMBODIMENT

Natural convection heat transfer across an enclosed vertical layer is classified into three modes depending upon the relationship of the Nusselt number and the Rayleigh number; that is, one mode provides a flow in layer form in which heat transfer principally depends on thermal conduction, another mode provides a flow in layer form which is transitional, and the other mode provides turbulent flow.

It was found that in most cases of vertically disposed isolated phase buses, particularly in the case where the vertical length of the isolated phase bus is larger, the flow mode of natural convection is a turbulent flow. It was also found that in the mode of turbulent flow of natural convection, the Nusselt number, which represents the heat transfer characteristic of natural convection in the enclosed vertical layer as explained above, becomes independent from the ratio of ($H/L$), that is, the ratio of ($H/L$) has no effect on the Nusselt number.

Figure 2:
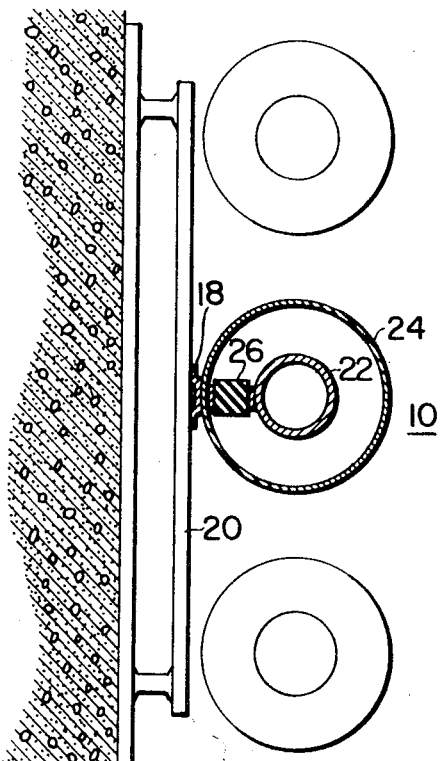
FIG. 2 is a sectional view of the present invention taken along the line II—II of FIG. 1.
Figure 1:
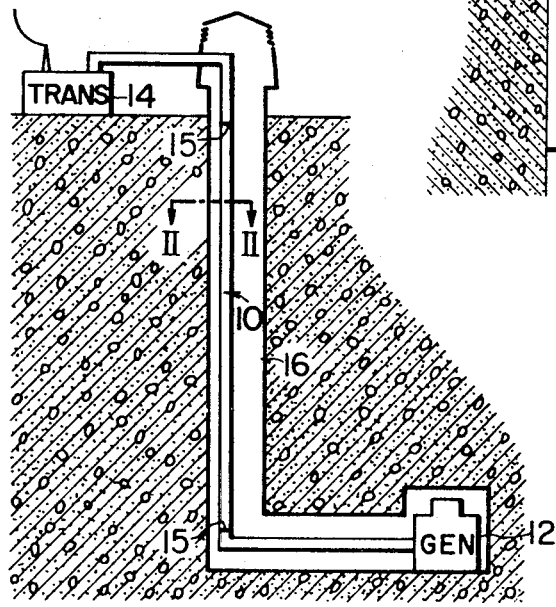
FIG. 1 is a diagrammatic view of a pumping up power station embodying the vertically disposed isolated phase bus of the present invention.

Referring now to the drawings and with particular reference to FIGS. 1–2, there is here illustrated a three-phase isolated phase bus embodying the present invention.

A three-phase isolated phase bus 10 electrically connects a generator 12 arranged in a room underground to a main transformer 14 on the ground through a vertical shaft 16. Each isolated bus 10 is secured to a common supporting frame 20 through supporting metal fitting 18, which supporting frame 20 is secured to the wall of the vertical shaft 16. For each isolated bus 10 a vertically disposed cylindrical conductor means 22 is enclosed by a cylindrical metal sheath 24 defining an annular space therebetween. In this annular space, many small turbulent free-convection flows, such as flows of shell or volute configuration, are successively and uninterruptedly formed along the vertical direction of the annular space, when the conductor means 22 is carrying electric current and heated thereby. The conductor means 22 is supported on the sheath 24 by relatively small insulating bushings 26 which are arranged at a predetermined distance from one another. At both ends of the sheath 24, there are disposed sealing means 15 to prevent moisture or dust from entering the annular space.

FIGS. 3a, 3b and 3c are graphical illustrations showing the temperature distribution of the conductor means, the sheath and the air layer in the annular space in accordance with the vertical distance from the ground. In FIG. 3a, the height ($H$) of the enclosed vertical layer is 20 m., since partition plates, which are shown by horizontal solid lines in the figure, are disposed every 20 m. along the vertical direction of the annular space. The thickness ($L$) of the layer is 0.267 m.; accordingly, the ratio of ($H/L$)≈75 and the Rayleigh number is $2.22 \times 10^7$.

In FIG. 3b, the height (H) of the layer is 10 m., since partition plates are disposed every 10 m. along the vertical direction of the annular space. The thickness (L) of the layer is the same as that of FIG. 3a; accordingly, the ratio of $(H/L) \approx 37$ and the Rayleigh number is $2.26 \times 10^7$.

In FIG. 3c, the height (H) of the layer is 5 m., since partition plates are disposed every 5 m. along the vertical direction of the annular space. The thickness (L) of the layer is the same as that of FIGS. 3a and 3b; accordingly, the ratio of $(H/L) \approx 19$ and the Rayleigh number is $2.49 \times 10^7$. According to the data provided in these figures, the mode of natural convection of these three examples of enclosed vertical layers is the turbulent mode.

In all of these three cases, here appears a temperature gradient along the vertical direction because of the heat exclusion characteristic of the sheath or cooling wall, and a discontinuity of the temperature distribution of each air layer appears at the point where the partition plate is disposed; accordingly, there exists a slight difference in the temperature distribution of the conductor means and the sheath in each case. However, it is seen that the temperature distribution of these three cases as a whole is substantially the same; accordingly, it clearly appears that the partition plates in these three cases have no effect on the heat transfer by the natural free-convection. FIG. 4 shows the relationship between the Nusselt number and Rayleigh number, which is obtained by rearranging experimental results performed with several vertically disposed isolated phase buses having different ratios of H/L and Rayleigh number operating in the mode of turbulent natural convection flow. It is understood that the Nusselt number is also independent from the ratio of (H/L). This result also teaches that the partition plates have no effect on the heat transfer by turbulent natural convection flow. It is found in particular in the case where the ratio of H/L is above 200, that the Nusselt number is substantially determined only by the Rayleigh number, independently from the ratio of (H/L).

What is claimed is:

1. An isolated phase bus comprising:
   substantially vertically disposed conductor means;
   casing means enclosing said conductor means centrally so as to define an annular space therebetween substantially uninterrupted over the whole length of said conductor means;
   supporting means located between said conductor means and said casing means supporting said conductor means on said casing means without restricting said annular space;
   sealing means disposed at both ends of said casing means for sealing said annular space;
   wherein substantially uninterrupted successive small turbulent free-convection flows are formed along the longitudinal direction of said annular space when said conducting means is carrying electric current.

2. An isolated phase bus, dependent on claim 1, wherein the ratio of the length of said conducting means to the distance between said conducting means and said casing means is above 200.

3. An isolated phase bus, dependent on claim 1, wherein said supporting means is the sole means disposed in said annular space.

4. An isolated phase bus, dependent on claim 3, wherein said supporting means includes a plurality of spaced insulating support arms, each support arm being connected between a point on said casing means and a point on said conductor means.

5. An isolated phase bus comprising:
   conductor means having a length in excess of several meters being substantially vertically disposed along the entire length thereof;
   casing means enclosing said conductor means centrally so as to define an annular space therebetween; and
   means for ensuring substantially uninterrupted successive small turbulent free-condition flow along the longitudinal direction of said annular space when said conductor means is carrying the electric current, including
   supporting means located between said conductor means and said casing means supporting said conductor means on said casing means without restricting said annular space; and
   sealing means disposed at both ends of said casing means sealing said annular space.

6. An isolated phase bus according to claim 5, wherein the ratio of the length of said conducting means to the distance between said conducting means and said casing means is above 200.

7. An isolated phase bus according to claim 6, wherein said supporting means includes a plurality of spaced insulating support arms, each support arm being connected between a point on said casing means and a point on said conductor means.

8. An isolated phase bus according to claim 7, wherein said phase bus is located in a vertical shaft, disposed beneath the surface of the earth and is connected at its respective ends, to a transmitter and generator, one of which is located at the surface of the earth and one of which is disposed at the bottom of said vertical shaft.

* * * * *